(12) United States Patent
Yerushalmi et al.

(10) Patent No.: US 9,587,117 B2
(45) Date of Patent: Mar. 7, 2017

(54) HYBRID METAL AND METAL OXIDE LAYERS WITH ENHANCED ACTIVITY

(71) Applicant: YISSUM RESEARCH DEVELOPMENT COMPANY OF THE HEBREW UNIVERSITY OF JERUSALEM LTD., Jerusalem (IL)

(72) Inventors: Roie Yerushalmi, Kfar Warburg (IL); Sergey Ishchuk, Jerusalem (IL); Niv Kaynan, Kibbutz Barkai (IL); Dereje Hailu Taffa, Addis Ababa (ET); Thangavel Subramani, Tamilnladu (IN)

(73) Assignee: YISSUM RESEARCH DEVELOPMENT COMPANY OF THE HEBREW UNIVERSITY OF JERUSALEM LTD., Jerusalem (IL)

( * ) Notice: Subject to any disclaimer, the term of this patent is extended or adjusted under 35 U.S.C. 154(b) by 112 days.

(21) Appl. No.: 14/390,552

(22) PCT Filed: Apr. 3, 2013

(86) PCT No.: PCT/IL2013/050306
§ 371 (c)(1),
(2) Date: Oct. 3, 2014

(87) PCT Pub. No.: WO2013/150533
PCT Pub. Date: Oct. 10, 2013

(65) Prior Publication Data
US 2015/0093597 A1    Apr. 2, 2015

Related U.S. Application Data

(60) Provisional application No. 61/619,692, filed on Apr. 3, 2012.

(51) Int. Cl.
| | |
|---|---|
| C30B 1/02 | (2006.01) |
| C09D 1/00 | (2006.01) |
| C09C 1/36 | (2006.01) |
| C09C 3/08 | (2006.01) |
| C01G 23/07 | (2006.01) |

(52) U.S. Cl.
CPC ............... C09D 1/00 (2013.01); C01G 23/07 (2013.01); C09C 1/36 (2013.01); C09C 1/3669 (2013.01); C09C 3/08 (2013.01); C01P 2002/54 (2013.01); C01P 2002/84 (2013.01); C01P 2002/85 (2013.01); C01P 2002/87 (2013.01); C01P 2004/04 (2013.01); C01P 2006/60 (2013.01)

(58) Field of Classification Search
CPC .............. C30B 1/02; C30B 1/04; C30B 29/36
See application file for complete search history.

(56) References Cited

U.S. PATENT DOCUMENTS

2009/0217878 A1* 9/2009 Levy ................. C23C 16/45551
  118/729
2013/0333835 A1* 12/2013 Carcia ................. C23C 16/403
  156/280

OTHER PUBLICATIONS

Leskela et al., "Atomic Layer Deposition (ALD): From Precursors to Thin Film Structures," Thin Solid Films, 2002, vol. 409, pp. 138-146.

(Continued)

Primary Examiner — Robert M Kunemund
(74) Attorney, Agent, or Firm — Oliff PLC

(57) ABSTRACT

The invention provides coalesced and un-coalesced organic/inorganic films and methods of use.

19 Claims, 9 Drawing Sheets

(56) References Cited

OTHER PUBLICATIONS

George, "Atomic Layer Deposition: An Overview," Chem. Rev., vol. 110, 2010, pp. 111-131.
George et al., "Surface Chemistry for Molecular Layer Deposition of Organic and Hybrid Organic-Inorganic Polymers," Accounts of Chemical Research, Apr. 2009, vol. 42, No. 4, pp. 498-508.
Liang et al., "Ultra-Thin Microporous-Mesoporous Metal Oxide Films Prepared by Molecular Layer Deposition (MLD)," Chem. Commun., 2009, pp. 7140-7142.
Gong et al., "Conformal Organic-Inorganic Hybrid Network Polymer Thin Films by Molecular Layer Deposition using Trimethylaluminum and Glycidol," The Journal of Physical Chemistry B, 2011, vol. 115, pp. 5930-5938.
George et al., "Metalcones: Hybrid Organic-Inorganic Films Fabricated Using Atomic and Molecular Layer Deposition Techniques," Journal of Nanoscience and Nanotechnology, vol. 11, 2011, pp. 1-8.
Liang et al., "Photoactivity Passivation of TiO2 Nanoparticles Using Molecular Layer Deposited (MLD) Polymer Films," J Nanopart Res, vol. 12, 2010, pp. 135-142.
Lee et al., "Rapid Vapor-Phase Fabrication of Organic-Inorganic Hybrid Superlattices with Monolayer Precision," J. Am. Chem. Soc., 2007, vol. 129, pp. 16034-16041.

\* cited by examiner

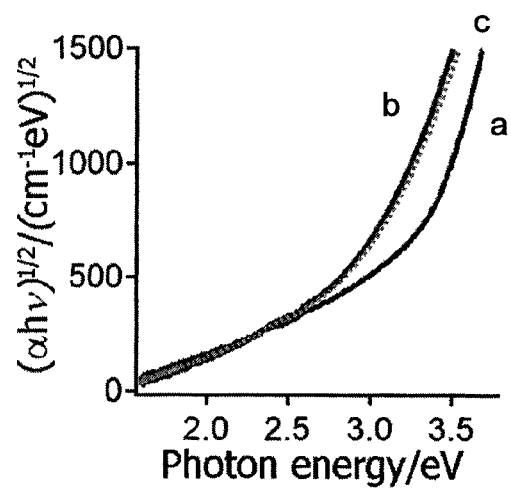
Figure 7
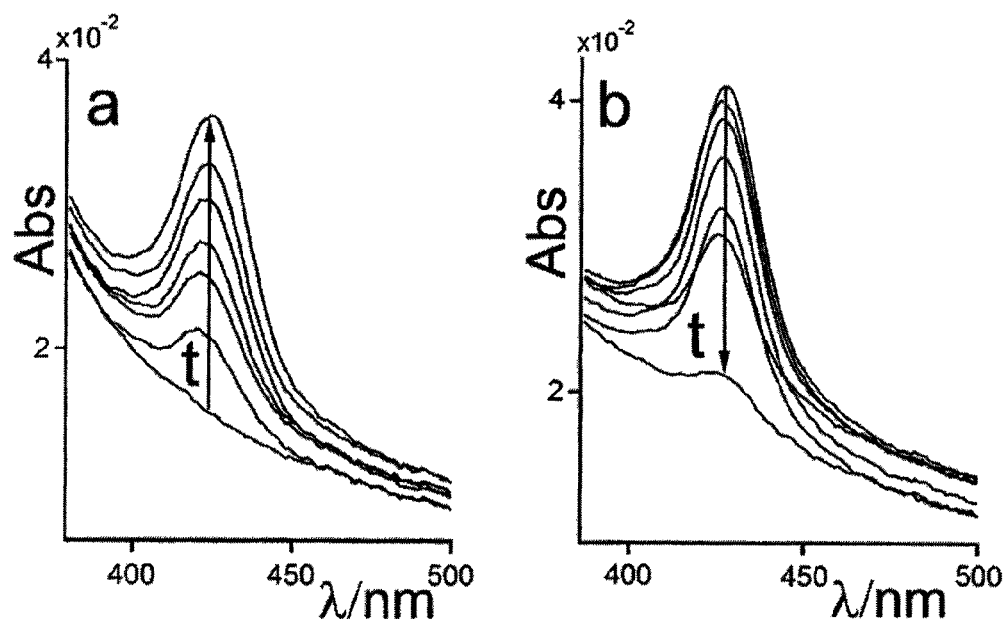
Figure 8A
Figure 8B

HYBRID METAL AND METAL OXIDE LAYERS WITH ENHANCED ACTIVITY

TECHNOLOGICAL FIELD

The present invention generally relates to hybrid metal and metal oxide materials and processes for their preparation

BACKGROUND

Molecular Layer Deposition, MLD, is an elegant modification of Atomic layer Deposition, ALD, in which one of the precursor atoms is replaced an oxygen atom, as depicted in Scheme 1 below. One subset of these MLD processes is based on a family of reactions that occur between a reactive metal precursor (such as $TiCl_4$) and an organic moiety such as aliphatic diol [1-5].

Scheme 1: Two step ALD (top) and MLD (bottom) processes.

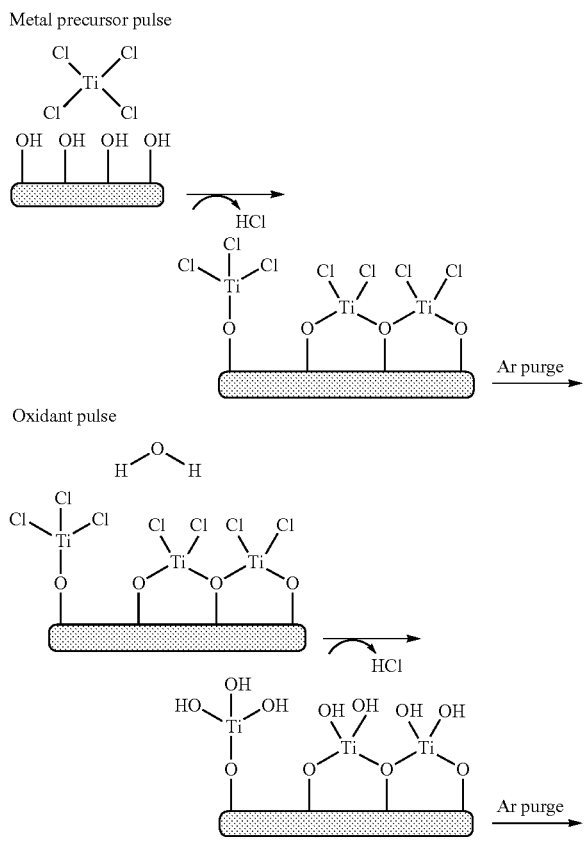

REFERENCES

[1] M. Leskela, and M. Ritala, *Thin Solid Films*, 2002, 409, 138.
[2] S. M. George, *Chem. Rev.* 2010, 110,
[3] S. M. George, B. Yoon and A. Dameron, *Acc. Chem. Res.* 2009, 42, 498.
[4] X. Liang, M. Yu, J. Li, Y-B. Jiang, A. W. Weimer, *Chem. Comm.* 2009, 7140.
[5] Bo Gong, Q. Peng, and G. N. Parsons, *J. Phys. Chem. B,* 2011, 115, 5930.

General Description

The inventors of the present invention have developed an approach for converting thin films prepared by Molecular Layer Deposition (MLD) to the corresponding metal oxide materials with unique properties/functions. The resulting hybrid metal and metal oxide materials obtained from these films, in accordance with the invention, have been found to be highly permeable at the molecular level and have demonstrated enhanced activities, e.g., photocatalytic activity.

The materials of the invention have additionally been demonstrated to be useful in separation of chiral molecules (e.g., by modifying chromatography column packing materials), for extraction of heavy metals, for the formation of slippery and hydrophobic surfaces and for a variety of additional applications as disclosed hereinbelow.

Thus, in one aspect of the present invention, there is provided a material (free or formed on a surface) comprising a metal oxide, wherein the metal oxide being non-porous (pin-hole free) and having high permeability at the molecular level. A film structure made of the material is not compact as the corresponding pure oxide, and allows diffusion and adsorption of small molecules and multivalent cations/ions therethrough. For example, for a film of $TiO_2$ made by the MLD-based process of the invention, electrochemical impedance spectroscopy demonstrated about order of magnitude lower impedance for the annealed Ti-EG film, as compared to a $TiO_2$ film prepared by ALD, for the same thickness.

It should be noted that the material of the invention is not porous, but rather permeable to small molecules. As the material of the invention is manufactured by a MLD-based process, the molecular density in the organic-inorganic layer produces, following annealing, permits formation of molecular voids with exhibited permeability and adsorption of small molecules. The molecular voids are not pores, even though pores may be present in the film. The materials of the invention thus demonstrate molecular level permeability.

Thus, the invention also provides a permeable organic/inorganic hybrid material, e.g., in the form of a film, said material comprising coalesced inorganic/organic particles having photocatalytic activity. As used herein, the term "coalesced" or any lingual variation thereof, refers to a material of the invention in which a molecular film formed of a metal precursor (a metal source) and an organic reactive material, as further detailed herein, have become coherent upon annealing to provide the metal oxide material of the invention.

The metal oxide material of the invention, obtained following annealing of the MLD film, comprises amorphous regions which abundance decreases as a function of temperature; at a temperature between 300-350° C. the material comprises an abundance of amorphous oxidized carbon species, non-stoichiometric metal oxide, and metal oxide surface defects which provide polar adsorption sites in high proximity to the crystalline metal oxide sites where photocatalysis occurs. As the anneal temperature increases to a temperature between 500-650° C. and even more so to between 800-850° C., the abundance of the amorphous sites decreases.

In another aspect of the invention, there is provided a process for producing a material according to the invention, the process comprising:
  forming an organic/inorganic molecular film on a surface;
    said molecular film being composed of a metal atom bonded to 1, 2, 3 or 4 organic moiety via metal-X bonds, wherein X is an atom such as N and O;

annealing said film at a temperature permitting formation of a metal oxide material according to the invention.

As indicated above, the process of the invention begins with the formation of an organic/inorganic molecular film on a surface material. The film is manufactured, as depicted in Scheme 2 below, by:

(1) forming a layer of a metal source, in some embodiments a metal halide, on the surface material; and (2) treating the layer of a metal source, while on the surface material, with an organic reactive material such as organic alcohols and organic amines, as defined herein; to permit formation of a molecular film composed of a metal atom bonded to 1, 2, 3 or 4 organic moiety via metal-X bonds, wherein X is an atom such as N and O.

Scheme 2

Metal precursor pulse

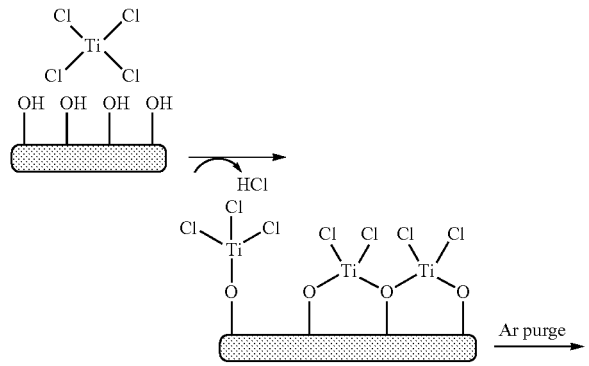

Oxidant pulse

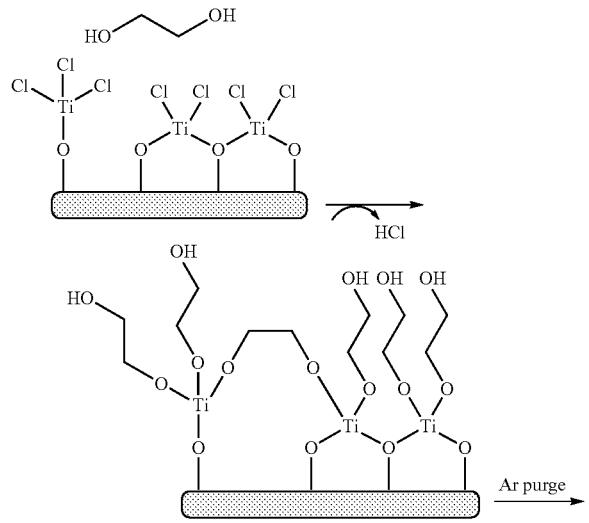

As illustrated in Scheme 2 above, in the case of a film which is composed of Ti atoms and ethylene glycols as the organic reactive moieties, each Ti atom is bonded to one or two surface oxygen atoms and two oxygen atoms, each of a different ethylene glycol molecule. Depending on the selection of the metal atom, the number of bonds formed between each of the metal atoms and the organic reactive groups (O or N) may vary between 1 and 4 as stated above.

In some embodiments, as further depicted in Scheme 2 above, the first reaction involves flowing a metal source, e.g., $TiCl_4$, over the surface of a substrate, to permit reaction with the surface material. In the second reaction, vapor of the organic active material, e.g., an oxidant such as ethylene glycol, EG, is flown to complete the reaction and provide free exposed functional groups (OH groups) that may be used in the construction of a second and further organic/inorganic layers, by repeating the two steps one or more times. Repeating the two reactions (metal source vapor, then exposure to vapor of the organic material) yields films with desired thicknesses in a step-wise manner. In some embodiments, the film comprises 1 or more organic/inorganic layers; a first layer is depicted in Scheme 2.

Each of the layers making up a film of the invention may be composed of the same metal and/or same organic reactive moiety. In some embodiments, the films are homogenous in terms of their composition, namely each of the layers comprising the same metal, e.g., Ti, and the same reactive moiety, e.g., EG. In other embodiments, the layers may differ from each other by at least parameter selected from metal type, organic reactive material, type of atom bonding to the metal atom, and other parameters. In some embodiments, each layer in a film of the invention comprises the same metal but with a different type of organic reactive moieties, e.g., some of the moieties are dialcohols and others are diamines.

As recited above, each film of the invention may comprise 1 or more layers. Each layer being an organic/inorganic molecular layer defined herein. In some embodiments, the number of organic/inorganic layers is between 1 and 200. In further embodiments, the number of organic/inorganic layers is less than 200.

In some embodiments, the number of organic/inorganic layers in a film according to the invention is between 1 and 200, 1 and 190, 1 and 180, 1 and 170, 1 and 160, 1 and 150, 1 and 140, 1 and 130, 1 and 120, 1 and 110, 1 and 100, 1 and 90, 1 and 80, 1 and 70, 1 and 60, 1 and 50, 1 and 40, 1 and 30, 1 and 20 or 1 and 10.

In some embodiments, the number of organic/inorganic layers in a film of the invention is 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99 or 100.

Without wishing to be bound by theory, the organic/inorganic hybrid film may be inhomogeneous in the way the organic reactive materials bind to the metal atoms. Some of the organic reactive materials may form bridges between the metal atoms (namely two or more of the functional groups form bonds to two or more metal atoms) while others may bind through only one functional group, as exemplified in the hybrid organic-inorganic film of Scheme 2.

Once the organic-inorganic hybrid film is formed, it may be annealed; thereby decomposing the organic reactive moieties and forming organic fragments with oxidized terminations, and further causing the bonds between the metal atoms and the organic moieties (e.g., metal-O) to coalesce and crystallize to form the metal oxide, e.g., $TiO_2$ anatase; the metal oxide being embedded in the fragmented oxidized organic components. Some of the organic moieties decompose and are lost from the film as oxidized carbon species, $CO_2$, and possibly other products.

In some embodiments, the film obtained after annealing is about 1-100 nm in thickness.

As used herein, the "metal source", being the material first reacted with the surface material, e.g., $TiCl_4$, is capable of binding to the surface material and to the organic reactive material, e.g., EG, and is, after binding to the organic active material, amenable to conversion to the metal oxide under the thermal annealing conditions.

The metal is typically selected amongst metallic elements including transition metals and metalloids of the Periodic Table of the Elements. In some embodiments, the metals are transition metals or metalloids.

In some embodiments, the metals are selected from Al, W, Sc, Ti, V, Cr, Mn, Fe, Co, Ni, Cu, Zn, Y, Zr, Nb, Mo, Tc, Ru, Rh, Re, Pd, Ag, Au, Cd, In, Sn, Sb, Te, Hg, Tl, Pb, Pt, Bi and Po. In some embodiments, the metal is selected from Zn, Zr, Fe, Ti, V, Cu, Ni, Bi and W.

In other embodiments, the metal is selected from Ti, Zn, Fe, V, Ni, Cu and Cr (e.g., yielding the metal oxides $TiO_2$, ZnO, $Fe_2O_3$, $V_2O_5$, NiO, CuO, $Cu_2O$, CrO, respectively).

In other embodiments, the metal is Ti.

The metal source is thus selected from a metal halide (wherein the halide is selected from Cl, Br, I and F); a metal alkoxide; a metal alkyl (wherein the alkyl ligand may be a long (more than 5 carbon atoms, including aryl groups, or a short alkyl having between 1 and 5 carbon atoms), wherein the alkyl being optionally substituted with one or more alcohol or amine groups; a metal acetylacetonate; a metal complex with one or more ligand moieties; of any of the aforementioned metal atoms.

In some embodiments, the metal source is selected from aluminum acetylacetonate, aluminum s-butoxide, aluminum ethoxide, aluminum hexafluoro acetylacetonate, aluminum i-propoxide, dimethylaluminum i-propoxide, tri-i-butylaluminum, triethylaluminum, triethyl(tri-sec-butoxy)dialuminum, tris(2,2,6,6-tetramethyl-3,5-heptanedionato)aluminum, triphenyl bismuth, tris(2,2,6,6-tetramethyl-3,5-heptanedionato)bismuth(III), dimethylcadmium, bis(cyclopentadienyl)chromium, bis(ethylbenzene)chromium, bis(pentamethylcyclopentadienyl)chromium, bis(i-propylcyclopentadienyl)chromium, chromium(III) acetylacetonate, chromium carbonyl, chromium(III) hexafluoroacetylacetonate, tris(2,2,6,6-tetramethyl-3,5-heptanedionato) chromium(III), bis(cyclopentadienyl)cobalt(II), bis(N,N'-di-i-propylacetamidinato)cobalt(II), cobalt tricarbonyl nitrosyl, tris(2,2,6,6-tetramethyl-3,5-heptanedionato)cobalt(III), bis(2,2,6,6-tetramethyl-3,5-heptanedionato) copper(II), copper (II) hexafluoroacetylacetonate, copper(II) hexafluoroacetylacetonate, copper(II) hexafluoro acetylacetonate, copper(II) trifluoroacetylacetonate, dimethyl(acetylacetonate)gold(III), dimethyl(trifluoroacetylacetonate)gold(III), indium(III) trifluoroacetylacetonate, trimethylindium, tris(2,2,6,6-tetramethyl-3,5-heptanedionato) indium(III), bis(cyclo pentadienyl)iron, bis(N,N'-di-t-butylacetamidinato)iron(II), bis(ethylcyclopentadienyl) iron, bis(pentamethylcyclopentadienyl)iron, bis(i-propylcyclopentadienyl)iron, cyclohexadiene iron tricarbonyl, iron pentacarbonyl, iron pentacarbonyl, iron(III) trifluoroacetylacetonate, tris(2,2,6,6-tetramethyl-3,5-heptanedionato)iron(III), bis(2,2,6,6-tetramethyl-3,5-heptanedionato)lead(II), bis(ethylcyclopentadienyl) manganese, bis(ethylcyclopentadienyl)manganese, bis(pentamethylcyclopentadienyl) manganese, manganese carbonyl, tris(2,2,6,6-tetramethyl-3,5-heptanedionato) manganese(III), bis(ethylbenzene)molybdenum, cycloheptatriene molybdenum tricarbonyl, molybdenum carbonyl, bis(cyclopentadienyl) nickel, bis(ethylcyclopentadienyl)nickel, bis(pentamethyl cyclopentadienyl)nickel, bis(i-propylcyclopentadienyl) nickel, bis(2,2,6,6-tetramethyl-3,5-heptanedionato)nickel (II), nickel(II) acetylacetonate, nickel(II) acetylacetonate, nickel carbonyl, bis(2,2,6,6-tetramethyl-3,5-heptanedionato)palladium(II), platinum(II) hexafluoroacetylacetonate, tetrakis(trifluorophosphine)platinum(0), (trimethyl)methyl cyclopentadienylplatinum (IV), (trimethyl)methylcyclopentadienylplatinum(IV), pentamethylcyclopentadienyl rhenium tricarbonyl, i-propylcyclopentadienylrhenium tricarbonyl, rhenium carbonyl, carbonyl (pentamethylcyclopentadienyl)rhodium(I), rhodium(III) acetylacetonate, bis(cyclopentadienyl)ruthenium, bis(ethylcyclopentadienyl)ruthenium(II), bis(penta methylcyclopentadienyl)ruthenium, bis(2,2,6,6-tetramethyl-3,5-heptanedionato)(1,5-cyclooctadiene)ruthenium(II), ruthenium carbonyl, tris(2,2,6,6-tetramethyl-3,5-heptanedionato)ruthenium(III), tris(2,2,6,6-tetramethyl-3,5-heptanedionato) scandium (III), 2,2,6,6-tetramethyl-3,5-heptanedionato silver(I), triethoxyphosphine (trifluoroacetylacetonate)silver (I), triethylphosphine(6,6,7,7,8,8-heptafluoro-2,2-dimethyl-3,5-octanedionate)silver(I), trimethylphosphine (hexafluoroacetylacetonato) silver(I), vinyltriethylsilane (hexafluoroacetylacetonato)silver(I), 2,2,6,6-tetramethyl-3,5-heptanedionato thallium(I), thallium(I) ethoxide, thallium (I) hexafluoro acetylacetonate, N,N'-di-t-butyl-2,3-diamidobutanetin(II), N,N'-di-t-butyl-2,3-diamidobutanetin (II), tetrakis(dimethylamino)tin(IV), tetrakis (dimethylamino) tin(IV), tetramethyltin, tin(II) acetylacetonate, tin(IV) t-butoxide, tin(II) hexafluoroacetylacetonate, cyclopentadienyl(cycloheptatrienyl)titanium(II), tetrakis(diethyl amino)titanium(IV), tetrakis(dimethylamino)titanium(IV), tetrakis(dimethylamino) titanium(IV), titanium(IV) n-butoxide, titanium(IV) t-butoxide, titanium(IV) ethoxide, titanium(IV) i-propoxide, (trimethyl)pentamethyl cyclopentadienyltitanium(IV), tris(2,2,6,6-tetramethyl-3,5-heptanedionato)titanium(III), mesitylene tungsten tricarbonyl, tungsten carbonyl, bis(cyclopentadienyl)vanadium, cyclopentadienyl vanadium tetracarbonyl, vanadium(III) acetylacetonate, vanadium(V) trichloride oxide, vanadium (V) tri-i-propoxy oxide, tris[N,N-bis(trimethylsilyl)amide] yttrium(III), tris(butylcyclopentadienyl)yttrium, tris(cyclopentadienyl)yttrium, tris(methylcyclopentadienyl)yttrium, tris(n-propylcyclopentadienyl)yttrium, tris(2,2,6,6-tetramethyl-3,5-heptanedionato)yttrium(III), yttrium(III) hexafluoroacetylacetonate, bis(2,2,6,6-tetra methyl-3,5-heptanedionato)zinc, diethylzinc, dimethylzinc, bis(cyclopentadienyl)dimethylzirconium, dimethylbis(t-butylcyclopentadienyl) zirconium, tetrakis(diethyl amino)zirconium, tetrakis(dimethylamino)zirconium, tetrakis(ethylmethylamino) zirconium, tetrakis(2,2,6,6-tetramethyl-3,5-heptanedionato)zirconium(IV), zirconium (IV) t-butoxide, zirconium(IV) ethoxide and zirconium(IV) hexafluoro acetylacetonate.

In some embodiments, the metal source is a metal halide.

In other embodiments, the metal source is of Ti; the material being selected from bis(tert-butylcyclopentadienyl) titanium(IV)dichloride; bis(diethylamido) bis(dimethyl amido)titanium(IV); tetrakis(diethylamido)titanium(IV); tetrakis(dimethylamido)titanium(IV); tetrakis(ethylmethylamido) titanium(IV); titanium(IV) diisopropoxidebis(2,2,6,6-tetramethyl-3,5-heptanedionate); titanium(IV) isopropoxide; and titanium tetrachloride.

The "organic reactive material" is an organic material which comprises two or more alcohol or amine functional groups, and which is capable of bonding to the surface bound metal atom via at least one of the material functional groups.

The organic reactive material is selected amongst such materials having sufficient vapor pressure and thermal stability under the conditions of the film formation.

The organic reactive material may be selected amongst aliphatic materials (alkylenes), alkenylenes, alkynylenes and arylenes (which may have one or two aryl rings, e.g., phenyl rings, bonded to each other or to a backbone alkylene, alkenylene and/or alkynylene moiety).

In some embodiments, the organic reactive material is an aliphatic material comprising between 2 and 5 carbon atoms and two or more alcohol and/or amine functional groups. In some embodiments, the "organic aliphatic material" is selected amongst materials having a C2-C5 carbon chain wherein one or more of said carbons are substituted with 2 or 3 functional groups selected independently from hydroxyl (—OH) and amine (—$NH_2$).

In some embodiments, the organic aliphatic material is selected amongst aliphatic alcohols and amines having sufficient vapor pressure and thermal stability under the conditions of the film formation.

In some embodiments, the organic aliphatic alcohol is selected from ethylene glycol (EG), 1,3-propanediol, 1,2-propanediol, 1,4-butanediol, 1,3-butanediol, 1,2-butanediol, 1,5-pentanediol, 1,4-pentanediol, 1,3-pentanediol, 1,2-pentanediol, glycerol, pentaerythritol, 1,2,4-butanetriol, 1,2-ethylenediamine 1,3-propanediamine, 1,2-propanediamine, 1,4-butanediamine, 1,3-butanediamine, 1,2-butanediamine, 1,5-pentanediamine, 1,4-pentanediamine, 1,3-pentanediamine, 1,2-pentanediamine, 1,2,3-propanetriamine, 1,2,4-butanetriamine, and others.

In some embodiments, the organic aliphatic alcohol is a dialcohol, e.g., ethylene glycol, EG.

The annealing of the film is typically thermal annealing; the thermal annealing being carried out at a temperature higher than the temperature under which the molecular film is produced. In some embodiments, the thermal annealing is carried out at a temperature above 200° C., above 300° C., above 400° C., above 500° C., above 600° C., above 700° C. or above 800° C. In some embodiments, the thermal annealing is carried out at a temperature between 200 and 400° C., between 400 and 700° C. or between 700 and 900° C.

In some embodiments, thermal annealing is carried out at a temperature between 300-350° C. or between 500-650° C. or between 800-850° C.

The annealing may be carried out under a variety of conditions and a selection of gaseous atmospheres. In some embodiments, the anneal stage is carried out in vacuo. In other embodiments, the anneal stage is carried out under a gaseous atmosphere wherein the gas is selected from air, nitrogen gas, hydrogen gas and other inert gases.

Depending on the thermal annealing temperature, the metal oxide material may comprise amorphous organic material being a decomposition product of the organic aliphatic alcohol. Thus, based on the annealing temperature three structures could be indentified: (i) an amorphous structure, (ii) an amorphous-crystalline structure, and (iii) a structure characterized by a plurality of crystalline regions.

In some embodiments, the process further comprising doping the film of an organic-inorganic molecular film, prior to annealing, with at least one metal atom, metal cation, non-metal dopants or otherwise another material (other organic or inorganic materials). The following non-metal elements can be used for the doping B, C, N, O, F, P and S; metal atoms doping with Zr, Hf, V, Ni, Nb, Nd, Ta, Cr, Mo, W, Cu, Ag, Au, Fe, Pd and Pt or any one cation of the aforementioned metal atoms. The selection of the appropriate dopant may depend on a variety of parameters, including: the photocatalytic material, the desired effect, the integrity of the photocatalytic material and the mechanical robustness of the material.

Dopant concentration may vary to a maximum of 10 percent (atomic composition).

In some embodiments, the metal precursor is Ti-halide, the organic aliphatic alcohol being ethylene glycol (EG), and thus the molecular layer formed is Ti-EG. Following annealing, the metal oxide material obtained is $TiO_2$. In some embodiments, $TiO_2$ is in a form selected from amorphous, semi-amorphous and crystalline, or mixed forms. In some embodiments, the $TiO_2$ is anatase $TiO_2$.

In some embodiments, the invention provides a metal oxide material obtainable (or obtained) by a process comprising:
  forming an organic/inorganic molecular film on a surface;
    as defined herein;
  annealing said film at a temperature permitting formation
    of a metal oxide material.

In some embodiments, the metal oxide material thus obtained is in a form selected from amorphous, semi-amorphous and crystalline, or mixed forms.

The film or annealed material may be treated as disclosed herein.

In all aspects and embodiments of the invention, the surface may be any surface structure and of any surface material. The surface may be of a metallic material, a semiconductor surface, a surface of an insulating material, glass, quartz, a silicon surface, a silicon oxide surface, germanium, germanium oxide, a carbonaceous substrate, thermally stable plastics, and any hybrid material.

The surface may be in the form of a substantially two-dimensional material surface, such as a material film or coating, or a patterned material having one or more three-dimensional features. The surface material may be any solid material which, for the purpose of ease of processing, may be layered, coated on or patterned on a substrate (a surface), such that the organic-inorganic film formed according to the process of the invention is confined to a specific region or to a particular pattern.

In some embodiments, the surface material to be modified may be in the form of a plurality of material particulates, or a variety of particulate dimensions and shapes. In some embodiments, the material particulate is selected amongst (nano)particles and (nano)wires. Thus, the organic-inorganic film formed according to the process of the invention may be formed on a nanoparticle, a nanowire, a microparticle or any other nano-, micro, or macro-size material, generally being of any shape and composition; In some embodiments, the nano-size materials are selected from spherical nanoparticles and nanoparticles of any polyhedral or non-spherical shapes, such as nanowires, nanotubes, nanorods and nanoribbons; the nanoparticulates having by at least one dimension that is in the nano-scale (i.e., between 1 and 1,000 nm or between 1 and 100 nm).

The nanoparticulates, e.g., nanowires may be layered on a substrate or may be free.

In some embodiments, the nanoparticulate material is a nanotube or a nanowire. In some embodiments, the nanowire is selected from inorganic single or multishell nanowires and nanotubes, silicon nanowires (SiNW), germanium nanowires, Si—Ge nanowires, carbon nanotubes, metal nanoparticles, metal-oxide nanoparticles, organic nanoparticles (such as polymer nanoparticles) core-shell nanoparticles and others.

The invention further provides a photocatalytic material obtained by molecular layer deposition (MLD).

When the materials/films of the invention are exposed to light they trigger or accelerate chemical reactions resulting, inter alia, in decomposition of organic molecules. Due to the large surface area of the materials and their nanosize, the photocatalytic effect exhibited is significantly enhanced as compared to the bulk materials.

The metal oxide materials/films of the invention are thus materials capable of decomposing a substance by irradiation of, e.g., ultraviolet light or white light.

Without wishing to be bound by theory, when a photocatalyst is illuminated by light stronger than its band gap energy (hv≥Eg), the photocatalyst generates electron/hole pairs with free electrons produced in the empty conduction band leaving positive holes in the valence band. Electron-hole pairs diffuse out to the surface of photocatalyst, initiating a series of chemical reactions following the usually proposed mechanism. Proper utilization of these photo-generated charge carriers can be used to decompose organic contaminants, generate electric power or store energy as chemical fuels ($H_2$). Thus, in some embodiments, the photocatalytic material of the invention is utilized in processes for decomposing organic materials which may be environmentally toxic or materials which decomposition is required for achieving a synthetic transformation.

An electrode or any member to be used in a photocatalytic process may be manufactured by coating the electrode or member surface(s) with a photocatalytic material of the invention. The electrode or member may alternatively be manufactured by forming a coating of the material mixed with a binder and applying the photocatalytic coating mixture onto the surface of electrode or member.

Devices comprising a photocatalytic electrode or member typically include in addition, e.g., a counter electrode, a water-containing electrolyte solution, and gas outlets for discharging any gas generated by the device.

The production of $H_2O_2$ (hydrogen peroxide) by oxidation of water or by reduction of oxygen was achieved, as exemplified hereinbelow. In some embodiments, nanowires, such as silicon and/or germanium nanowires, were used as scaffolds coated with Ti-EG films and subsequently optionally annealed. The coated nanowires were subsequently treated by galvanic displacement reaction and were etched with HF leading the formation of hollow Ti-EG tubes coated with a nobel metal such as Au. Thus, in some embodiments, the scaffold used of the production of hydrogen peroxide comprises a nanowire decorated with gold nanoparticles.

As known, in galvanic displacement, metal ions from solution are reduced to the metal, with the subsequent oxidation (and typically dissolution) of the substrate material. This method permits deposition of the metals selectively onto the oxidizable substrate. In some embodiments, the metals which may be used include Au, Ag, Cu, Pt, Pd, Rh, Ru, Ir and Re, and any of the other metals mentioned hereinabove as possible dopants.

The photocatalytic materials of the invention may additionally be utilized in light induced destruction/decomposition of toxic materials, such as organic pollutants (such as volatile organic carbons (VOC), formaldehyde, ammonia, chemical warfare agents and others), inorganic pollutants (such as heavy metals, $NO_X$ and $SO_X$), and biological contaminants such as bacteria, viruses and fungi, and biological warfare agents. The photocatalytic destruction/decomposition of such materials may be carried out in a gaseous medium, e.g., air, or when solubilized in a liquid medium such as water.

Thus, the photocatalytic materials may be formed into a variety of products and purification systems, including air filters, ventilation members, air conditioning systems and others. The materials may also be utilized in water treatment systems for clearing out soluble pollutants and contaminants.

The materials may have particular relevance in surface sterilization in areas such as biomedical engineering and food preparation.

Due to the unique permeability of the materials of the invention, at least some of the pollutants/contaminants may be entrapped by the metal oxide material.

The materials of the invention may additionally be used in the construction of hydrophilic surfaces, which repel water and other aqueous media from forming droplets. Such hydrophilic surfaces are thus easy to clean and demonstrate considerable anti-fogging effects.

For any of the above applications, the metal oxide is typically of a metal, a metalloid or a transition metal of the Periodic Table of the Elements. In some embodiments, the metal is selected from Al, W, Sc, Ti, V, Cr, Mn, Fe, Co, Ni, Cu, Zn, Y, Zr, Nb, Mo, Tc, Ru, Rh, Re, Pd, Ag, Au, Cd, In, Sn, Sb, Te, Hg, Tl, Pb, Pt, Bi and Po. In some embodiments, the metal is selected from Zn, Zr, Fe, Ti, V, Cu, Ni, Bi and W.

In other embodiments, the metal is selected from Ti, Zn, Fe, V, Ni, Cu and Cr.

Due to their high photosensitivity, photochemical stability, large band gaps, strong oxidizing power and non-toxic nature, in some embodiments, the metal oxide materials utilized in the aforementioned applications are selected amongst $TiO_2$ and ZnO. In some embodiments, the $TiO_2$ is anatase $TiO_2$.

In an additional aspect, the invention provides a hydrophobic surface (a slippery surface) composed of a hybrid organic/inorganic film constructed by molecular layer deposition and optionally annealed.

In some embodiments, the slippery surface is produced by a process comprising:
  forming an organic/inorganic molecular film on a surface;
  treating the film with at least one oil; and
  optionally annealing said film prior to or after treatment with said oil at a temperature permitting entrapment, bonding, association, intercalation, adsorption or absorption of said oil to/into or with the film.

As indicated above, the hybrid organic/inorganic film is formed by:
  (1) forming a layer of a metal source, typically a metal halide, on the surface material; and
  (2) treating the layer of a metal source on the surface material, e.g., metal halides, with an organic active material such as aliphatic alcohols and aliphatic amines.

The steps may be repeated such that a further layer of a metal source is formed on the exposed layer of the organic active material in order to modify the thickness of the film. The exposed, e.g., hydroxyl or amine functionality of the organic-inorganic layers is a key feature for the physical and chemical modification of the surface. The layers can serve as a host material for the immobilization of liquids with different polarities. Thus, there are obtained stable liquid films having different wetting properties which can act as buffer surfaces to reduce friction and which generally serve to control surface interactions with any other material or component applied to the surface.

In some embodiments, the oil used for the production of the slippery surfaces is a fluorinated liquid, such as a high boiling perfluoropolyether liquid.

In some embodiments, the perfluoropolyether having the general structure X—$CF_2$—O—($CF_2$—$CF_2$—O)$_p$—($CF_2$—O)$_q$—$CF_2$—X, wherein each X is independently selected from —$CH_2OH$, —$CH_2(O-CH_2-CH_2)_yOH$, —$CH_2OCH_2CH(OH)CH_2OH$ and —$CH_2$—$CH_2$— piperonyl, wherein y is between 1 and 60 and wherein the ratio p/q is about 2/3.

In some embodiments, the fluorinated liquid is selected from pentafluorophenyltriethoxysilane (PFPTES); Krytox® GLP 100, GLP 105 or GLP 160 (du Pont); Fomblin® Z-Dol 2000, 2500 or 4000, Z-Tetraol, or Fomblin® AM 2001 or AM 3001 (Solvay Solexis S.p.A.); Demnum™ LR-200 or S-65 (Daikin America, Inc.); X-1 P® (Quixtor Technologies Corporation, Dow Chemical Co.); and mixtures thereof.

The Krytox® materials are perfluoroalkylpolyethers having the general structure $F(CF(CF_3)CF_2O)_n$—$CF_2CF_3$ wherein the integer n ranges from 10 to 60.

The Fomblin® materials are perfluoropolyethers ranging in molecular weight from 500 to 4000 at. Mass units and having the general formula X—$CF_2$—$O(CF_2$—$CF_2$—$O)_p$—$(CF_2O)_q$—$CF_2$—X, wherein X may be —$CH_2OH$, —$CH_2(O$—$CH_2$—$CH_2)_yOH$, —$CH_2OCH_2CH(OH)CH_2OH$ or —$CH_2O$—$CH_2$-piperonyl.

The Demnum™ materials are perfluoropolyether-based oils ranging in molecular weight from 2700 to 8400 at. mass units.

In some embodiments, the fluorinated oil is a Fomblin material.

In some embodiments, once obtained, the film containing the oil is annealed.

In some embodiments, the film is annealed prior to treatment with said oil.

The treatment of the film with the fluorinated liquid may be achieved by any method selected from soaking, spin coating, spraying and by any other method of applying the oil to the film, thus anchoring a liquid film of the liquid in the film.

The ability of the un-annealed film, e.g., Ti-EG film, to capture, entrap or absorb thereinto or to its surface, liquids and soluble materials, as discussed herein, allows utilizing the MLD-prepared films as substrates for absorbing or capturing a variety of materials ranging from soluble metal ions, heavy metals, liquids and soluble solids and gases, and a great variety of other agents in a range of amounts and material forms. Once captured in the MLD formed film, the film may optionally be annealed as described herein.

Thus, the un-annealed film may additionally be utilized in devices, systems or apparatuses for capturing and removing from a medium a variety of materials, such as toxic materials, organic pollutants (such as volatile organic carbons (VOC), formaldehyde, ammonia, chemical warfare agents and others), inorganic pollutants (such as heavy metals, $NO_X$ and $SO_X$), and biological contaminants such as bacteria, viruses and fungi, and biological warfare agents. The ability of the un-annealed films of the invention to capture such materials has been demonstrated in gaseous media, e.g., air, as well as in liquid media such as water.

Thus, the un-annealed films, e.g., organic/inorganic molecular film, may be utilized in a variety of products and purification systems, including air filters, ventilation members, air conditioning systems and others. The materials may also be utilized in water treatment systems for clearing out soluble pollutants and contaminants.

For such applications, the metal is typically a metal or a transition metal of the Periodic Table of the Elements.

In some embodiments, the metal is selected from Al, W, Sc, Ti, V, Cr, Mn, Fe, Co, Ni, Cu, Zn, Y, Zr, Nb, Mo, Tc, Ru, Rh, Re, Pd, Ag, Au, Cd, In, Sn, Sb, Te, Hg, Tl, Pb, Pt, Bi and Po. In some embodiments, the metal is selected from Zn, Zr, Fe, Ti, V, Cu, Ni, Bi and W. In other embodiments, the metal is selected from Ti, Zn, Fe, V, Ni, Cu and Cr.

In another aspect of the invention, there is provided a composition useful as a stationary phase for a variety of chromatographic applications, such as liquid chromatography (LC), e.g., high performance liquid chromatography (HPLC), solid phase extraction (preparatory columns) and thin layer chromatography.

The invention also provides a method of preparing a stationary phase, the method comprising providing a solid support, and a hybrid organic/inorganic film according to the invention, bonded to a surface region of said support.

In some embodiments, the stationary phase is formed into a form suitable for liquid chromatography.

In some embodiments, the solid support having pores on at least a region of its surface. In some embodiments, the solid support is selected from an inorganic solid support, e.g., silica gel or other silica materials and an organic solid support, such as polymeric organic materials.

In yet another aspect, the invention provides a separation device comprising an organic/inorganic hybrid material according to the invention, wherein said material. In some embodiments, the separation device is a chromatography column including a composition of the invention.

The invention also provides a method of chromatographic separation for separating analytes in a liquid sample, for chiral separations, for selective separation of materials based on their structure and atomic composition, the method comprising flowing a liquid through a solid medium comprising a composition of the invention, and collecting the analyte, separated enantiomers or other materials based on their elution time.

For any of the above chromatographic applications, the metal oxide is typically of a metal, a metalloid or a transition metal of the Periodic Table of the Elements. In some embodiments, the metal is selected from Al, W, Sc, Ti, V, Cr, Mn, Fe, Co, Ni, Cu, Zn, Y, Zr, Nb, Mo, Tc, Ru, Rh, Re, Pd, Ag, Au, Cd, In, Sn, Sb, Te, Hg, Tl, Pb, Pt, Bi and Po. In some embodiments, the metal is selected from Zn, Zr, Fe, Ti, V, Cu, Ni, Bi and W.

In other embodiments, the metal is selected from Ti, Zn, Fe, V, Ni, Cu and Cr.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 6A—Fe doped; FIG. 6B—Ni doped film.

FIG. 7 shows plot of $(\alpha h\nu)^{1/2}$ versus $h\nu$ for Ti-EG films post annealed at 750° C. (line a), Ni doped film (line b), Fe doped (dash line c).

FIGS. 8A-B show the adsorption (FIG. 8A) and photodegradation (FIG. 8B) of 4OHTPP on Ti-EG film annealed at 650° C. Photodegradation was induced by illumination of UV light (365 nm).

FIG. 13A—of (±) 2-methyl-1,4-butanediol: (left to right) spot 1, lower spot (−)-isomer and the upper spot for (+)-isomer; mobile phase $CH_2Cl_2/C_6H_{14}$ (4:1) and (−)-butanediol adsorbed on Ti-EG coated silica gel as a stationary phase. FIG. 13B—(±)-1-phenylethanol: (left to right) spot 1, lower spot (−)-isomer and the upper spot (+)-isomer; mobile phase $CH_2Cl_2/C_6H_{14}$ (1:5) and (+)-phenylethanol-adsorbed on Ti-EG coated silica gel as a stationary phase. Development condition; 10 min; at room temperature; detection by iodine vapor.

FIG. 15A—Ca 2p region for Ti(EG) MLD films and dipped for 30 min in a solution of $CaNO_3$; FIG. 15B—Fe 2p region for Ti-EG MLD films and dipped for 30 min in a solution of $FeNO_3$.

DETAILED DESCRIPTION OF THE INVENTION

1. General Considerations: Molecular Layer Deposition (MLD)

Ti-EG layers, as exemplary layers according to the invention, were prepared using custom build system by dosing the reactant precursors into viscous flow reactor using Ar carrier gas. The duration of precursor dosing was controlled using computer controlled pneumatic valves. Different process parameters such as precursor chamber temperature, deposition temperature and pressure were optimized for reproducible film formation. The films were grown on various substrates such as $SiO_2$/Si wafers, quartz/glass slides, TLC slides and Si nanowires.

Figure 1:
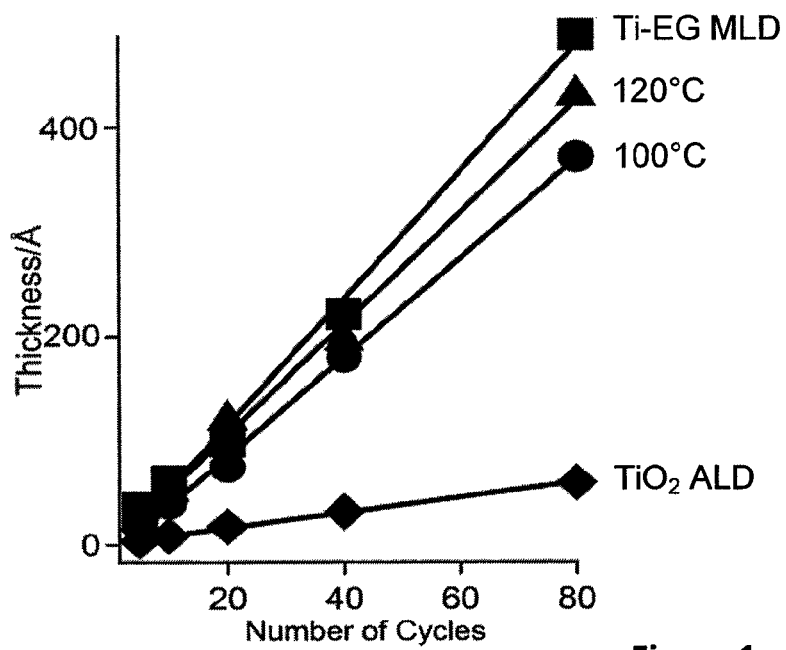
FIG. 1 depicts film thickness vs. number of cycles at 100° C. (●), 110° C. (▲), 120° C. (■); for Ti-EG MLD, and (♦) $TiO_2$ ALD.
Figures 2A, 2B:
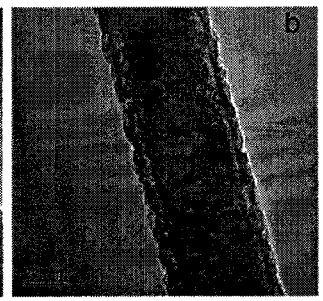
FIGS. 2A-C show TEM images of SiNW coated with Ti-EG films annealed at (FIG. 2A) 250° C., (FIG. 2B) 650° C., and (FIG. 2C) 850° C.
Figure 2C:
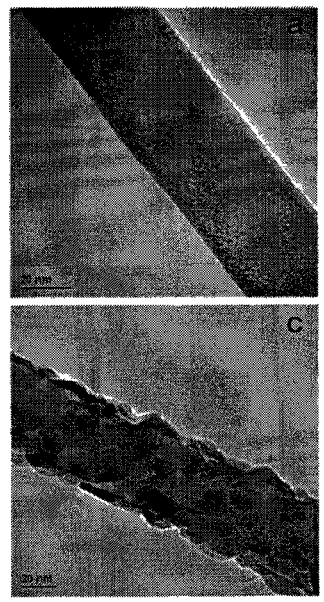

The MLD process involving $TiCl_4$ and ethylene glycol (Ti-EG), which is similarly suitable for use with other metal halides and active organic molecules such as diols, was found highly controllable and reproducible. Ellipsometric measurements showed Ti-EG film thickness growing linearly with deposition cycle with 4.5 to 6 Å thickness increase per $TiCl_4$/EG cycle at the temperature range studied 100-120° C. (FIG. 1). An exemplary set of experimental conditions for the formation of Ti-EG MLD films and $TiO_2$ ALD films is summarized in Table 1. TEM imaging showed the morphology change during thermal annealing and extremely conformal films at the nanometric scale (FIG. 2). Based on the annealing temperature, three structures could be indentified: (i) amorphous, (ii) amorphous-crystalline, and (iii) crystalline regions.

TABLE 1

Process parameters for Ti-EG MLD and $TiO_2$ ALD films formed at various reaction temperatures. $TiCl_4$ precursor at 25° C. EG and $H_2O$ precursor temperatures were at 80 and 40° C., respectively.

| $TiCl_4$/Ar purge/sec | EG/Ar purge/sec | T/° C. | Oxygen sources |
|---|---|---|---|
| 0.3/9 | 70/30 | 100 | EG |
| 0.3/6 | 35/35 | 110 | |
| 0.3/6 | 30/30 | 120 | |
| 0.3/6 | 0.4/10 | 100 | $H_2O$ |

Additionally, TEM electro diffraction pattern showed only the presence of anatase phase for films annealed at 650 and 850° C. The photocatalytic activity of the resulting structure mainly dependent on the annealing temperature as described below.

Film Optical Properties

Figure 3:
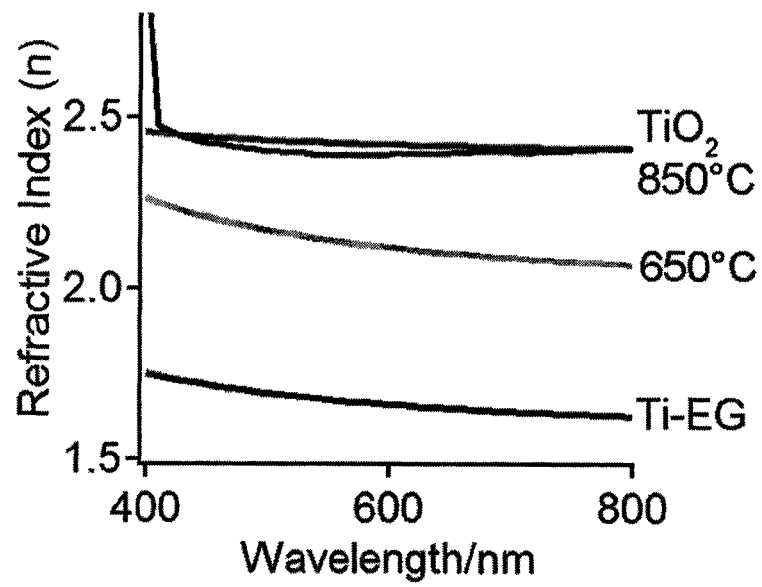
FIG. 3 shows refractive index versus wavelength for ALD $TiO_2$ as compared with Ti-EG films prepared and annealed in accordance with the invention.

FIG. 3 shows the refractive index, n, versus wavelength for Ti-EG film, grown at 100° C. with a thickness of 180 Å. The as-prepared Ti-EG film yielded refractive value at 590 nm of ~1.7. As a result of the annealing, an increase in refractive index was observed. For the Ti-EG films annealed at 650 and 850° C., the refractive index values were ~2.1 and ~2.4 at 590 nm. The refractive index of $TiO_2$ ALD films deposited at 100° C. are also displayed for comparison. The $TiO_2$ film prepared by ALD had a refractive index of 2.4 at 590 nm. It can be concluded, that the refractive index values of as prepared Ti-EG were much lower due to the organic part of the film as compared to $TiO_2$ ALD film. Ti-EG films annealed at these high temperatures gave similar refractive index values to $TiO_2$, due to the decomposition of the organic component and retaining the Ti—O frame.

Band gap for the Ti-EG and $TiO_2$ ALD films were obtained by using Tauc's equation (Eq. 1).

$$\alpha = [\{B \cdot (h\nu - E_g)^p\}/h\nu]$$ (Eq. 1)

In Eq. 1, B is a constant and p is an index that characterizes the optical absorption process and is theoretically equal to ½ for direct band gap materials and is 2 for indirect band gap materials. The absorption coefficient ($\alpha$) of the films was calculated from the absorbance by using the relation: $\alpha$=2.303 A/t, wherein A is the optical absorbance and t thickness of the film.

Figure 4:
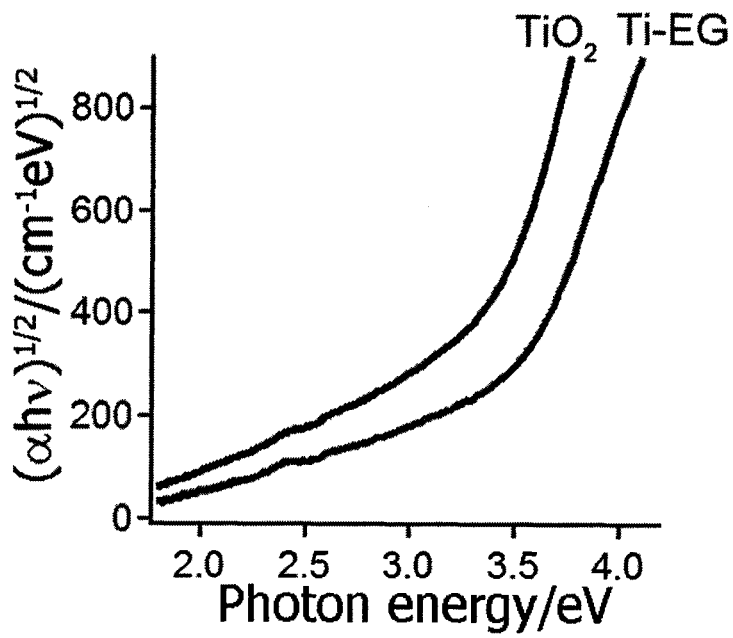
FIG. 4 depicts a plot of $(\alpha h\nu)^{1/2}$ versus hν for Ti-EG and $TiO_2$ films.

Values of the optical band gap for as-prepared Ti-EG and $TiO_2$ ALD films were extracted by plotting $(\alpha h\nu)^{1/2}$ versus $h\nu$ and extrapolating the linear portion to $(\alpha h\nu)^{1/2}$=0 (FIG. 4).

The band gap of the as-prepared Ti-EG film was measured at ~3.5 eV, because of the presence of the organic part in the film the band gap was lower as compare to $TiO_2$ ALD film (~3.3 eV).

After annealing at 250° C. and 650° C., the values of the band gap decreased to ~3.45 eV and ~3.34 eV, respectively. At a higher temperature the band gap became similar to the anatase phase band gap described in literature 850° C.-~3.3 eV.

Doping of $TiO_2$

Doping is one of the typical approaches to extending the spectral response of $TiO_2$ to the visible light region. Doping by metal-cations (transition metals) and non-metal dopands (for example C, N, B) has been intensively investigated. Doping $TiO_2$ with transition metals such as Fe, Ni, V and Cr was used for achieving visible light photocatalytic activity by shifting the adsorption edge to longer wavelengths. Cation doping induced the narrowing of the band gap of $TiO_2$. It is known that in the metal ion-implanted $TiO_2$ the overlap of the Ti d-orbital of $TiO_2$ and the metal d-orbital of the implanted metal ions leads to the narrowing of the band gap of the material. Moreover, the dopant ion induces the formation of new states close to the conduction band. Therefore, doping by metal ions greatly improved the photocatalytic activity in the visible light region. On the other hand, it inhibited the recombination of the photogenerated electron and hole. Metal ions with a suitable concentration could trap the photogenerated electron, which enhanced the utilization efficiency of the photogenerated electron and hole. Decrease of charge carriers recombination resulted in enhanced photoactivity. The absorption edge of metal doped $TiO_2$ is known to be red-shifted to the visible red light with shift decreased in the following order: V>Cr>Mn>Fe>Ni. The shift increases slightly with the percent content of metal dopands in the modified samples.

Metal Cation Doping

Doping of the films was performed for as-prepared Ti-EG films formed by MLD on quartz slides. Different metal acetylacetonates were used as precursor dopands, Ni(II) acetylacetonate 0.045M and iron(III) acetylacetonate 0.18M in acetonitrile. The coated quartz slides were immersed in the metal acetylacetonate solution for 30 min, rinsed for 10 sec with acetonitrile, and dried under $N_2$. Then quartz slides were annealed at various temperatures.

Doping of Ti-EG Films by Transition Metals

Figures 5A, 5B:
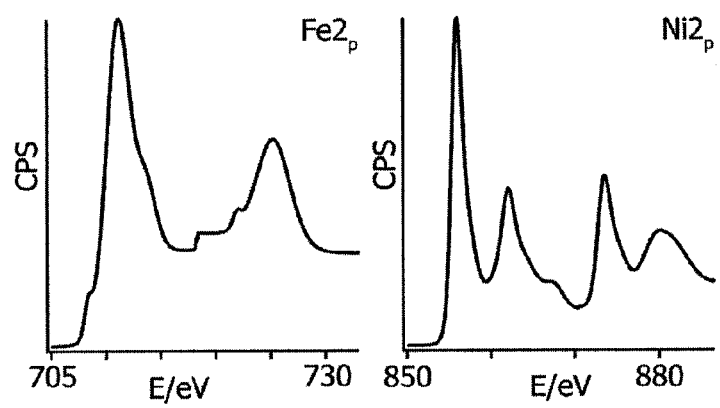
FIGS. 5A-B show representative XPS spectra of Ti-EG films prepared at 100° C., 40 cycles and doped by Fe (FIG. 5A) and Ni ions (FIG. 5B).

Ti-EG films showed high affinity towards transition metal cations. FIG. 5 shows representative XPS data obtained for Ti-EG layers exposed to solutions containing $Fe^{3+}$ and $Ni^{2+}$ ions.

For doping Ti-EG films, quartz slides with Ti-EG films were dipped in acetonitrile solutions of iron acetylacetonate or nickel acetylacetonate for 30 min, dried under $N_2$ stream and annealed at 250-850° C.

Figures 6A, 6B:
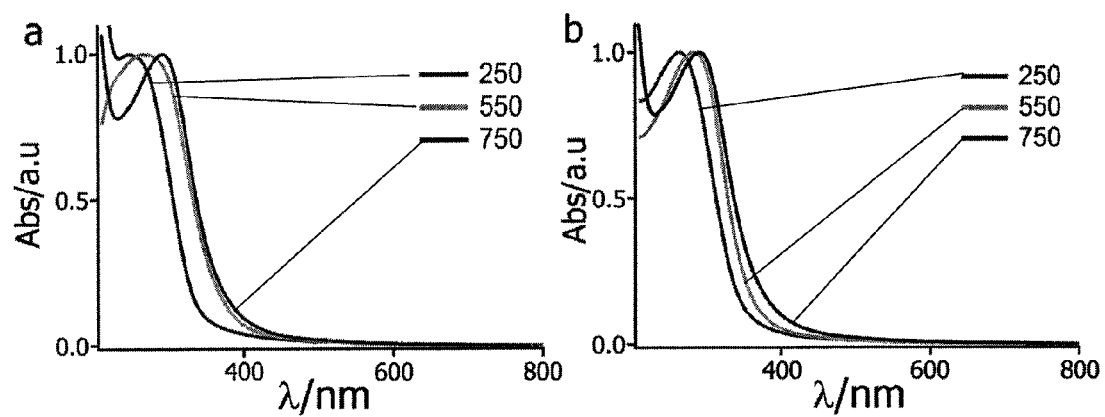
FIGS. 6A-B show the UV-Vis absorption spectra of undoped and doped Ti-EG films that were post-annealed at different temperature.

By increasing the anneal temperature, the absorbance red shift increased until ~750° C. (FIG. 6). Controlling the dopand concentration allowed producing more uniform films, without formation additional oxide of the dopant phase on the surface of the layer, therefore the optimal concentration of acetylacetonate solutions is 0.18 mM in the case studied here.

The band gap energy values for undoped Ti-EG films annealed at various temperature range from 3.42 to ~3.3 eV, for the metal doped films the band gap values in range from 3.3 to ~2.7 eV, depend on the activation temperature (Table 2). Maximal red shift was observed for the films annealed at 750° C., with the band gap extracted for Fe-doped and Ni-doped is 2.74 and 2.7 eV, respectively (FIG. 7).

TABLE 2

Indirect band gap energies for Ti-EG films annealed at different temperatures and treated with different metal cations.

| T/° C. | Ti-EG/eV | Fe-/eV | Ni-/eV |
|---|---|---|---|
| 250 | 3.42 | 3.28 | 3.36 |
| 350 | 3.25 | 3.19 | 2.98 |
| 450 | 3.28 | 2.91 | 2.94 |
| 550 | 3.29 | 2.79 | 2.81 |
| 650 | 3.34 | 2.91 | 2.82 |
| 750 | 3.3 | 2.74 | 2.7 |
| 850 | 3.3 | 3.012 | 3.04 |

2. Applications 2.1 Photocatalyic Layers 2.1.1 Photo-Decomposition of Compounds; Adsorbed Films of Porphyrin Porphyrin molecules are versatile molecular probes for studying molecular interfaces using their unique spectroscopic and structural properties. In order to evaluate the photocatalytic and molecular loading properties of films of the invention, 5,10,15,20-tetrakis(4-hydroxyphenyl)-21H,23H-porphine (4OHTPP) was used as a spectroscopic marker to study the adsorption into the films; as well as to study the molecular interactions within the films. The 4OHTPP hydroxyl groups facilitate adsorption of the porphyrin to polar surface groups found in Ti-EG as well as in $TiO_2$ films from polar aprotic solvents such as acetonitrile.

For measuring the photocatalytic degradation of 4OHTPP on Ti-EG or $TiO_2$ films, quartz slides coated with Ti-EG or $TiO_2$ films were annealed at various temperature and immersed in the 0.08 mM solution of porphyrin in acetonitrile for 2 hrs, rinsed three times with acetonitrile, and dried under $N_2$ stream in the dark. Then, the dry films were subjected to a 365 nm light source for different time intervals and the decrease in Soret band absorbency was followed with UV-Vis spectrophotometry (FIG. 8).

Figure 9:
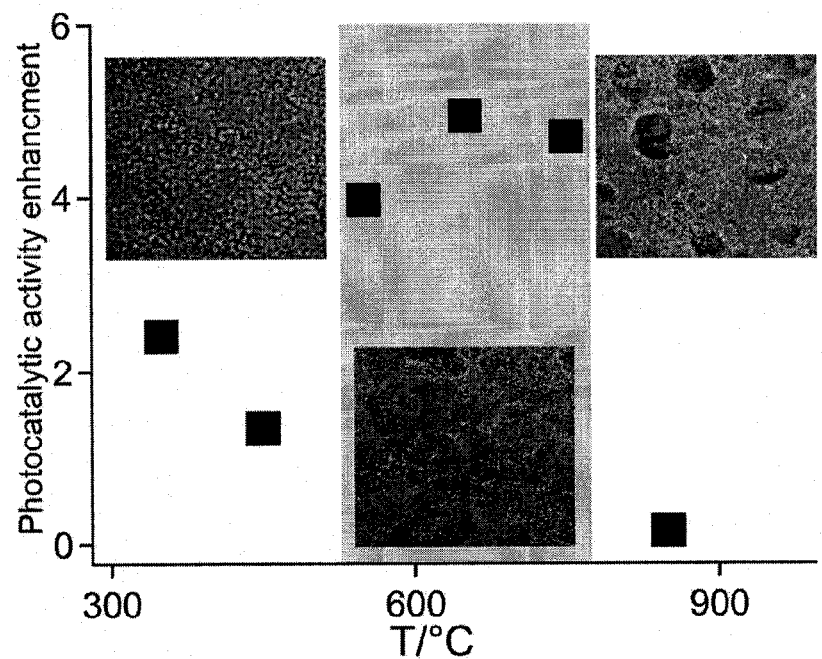
FIG. 9 shows the enhanced photocatalytic activity of Ti-EG films over $TiO_2$ films as a function of anneal temperature. High activity related to amorphous-crystalline structure (550-750° C.).

The relative photocatalytic activity of the Ti-EG films were evaluated and compared with $TiO_2$ films prepared in similar way. The amount of time needed to bleach half of the porphyrin adsorbed was measured. A 5-fold increase in activity was achieved at the annealing conditions (FIG. 9).

2.1.2 Photo-Decomposition of Compounds; Methylene Blue (MB) in Solution

Figure 10:
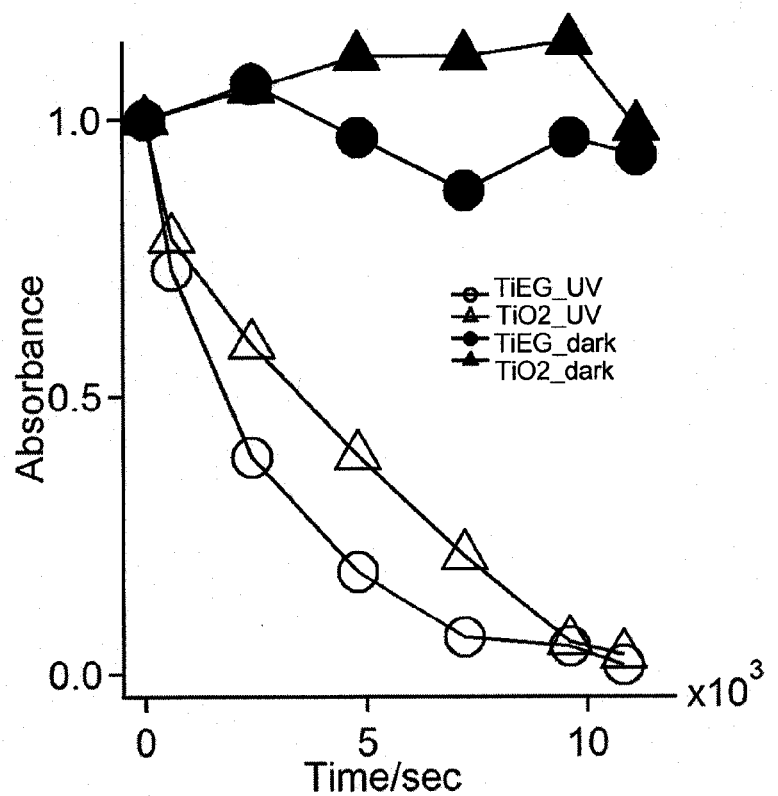
FIG. 10 demonstrates the photocatalytic degradation of methylene blue (MB) in aqueous solution. TiEG and $TiO_2$ films of same thickness, annealed at 650° C., were immersed in 0.01 mM solution of MB and irradiated with UV; the decrease in absorbance at $\lambda$=664 nm was followed.

Methylene blue was used as a model compound in photodecomposition of organic contaminants. The stability and performance of $TiO_2$ based catalyst is commonly tested with irradiating an aqueous solution of MB in the presence of the catalyst and compared with known reference. The photocatalytic degradation of methylene blue (MB) in aqueous solution was performed by irradiating 0.01 mM solution of MB in the presence of Ti-EG or $TiO_2$ films. The results showed that the Ti-EG films of the invention decomposed MB faster than $TiO_2$ and were stable under the working condition (FIG. 10).

2.1.3 $H_2O_2$ Production

The primary process in photocatalytic systems is photogeneration of hole and electron pairs. Proper utilization of the photo generated charge carriers can be used to decompose organic contaminants, generate electric power or store energy as chemical fuels Silicon nanowires (SiNWs) were grown in a custom built CVD system using vapor-liquid-solid (VLS) mechanism. For nanowires growth on different substrates, poly-L-lysine solution, a polycation for the adsorption of metal catalyst was employed. Au nanoparticles of different diameters ranging 15-80 nm served as the metal catalysts to initiate the nanowire growth. $SiH_4$ and $H_2$ were used as reactive gases. The as-prepared nanowires were used as templates for film formation. Electroless deposition of Au in (or on) Ti-EG or $TiO_2$ coated SiNWs was performed by immersion into solution containing 1 mM $AuCl_3$ and 0.2 M HF for 5 min, leading to the galvanic deposition of the gold nanostructures in the Ti-EG or $TiO_2$ coated SiNW.

Figure 11A:
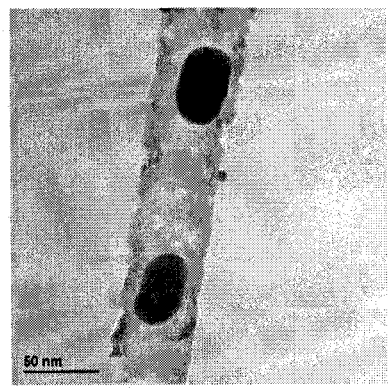
FIGS. 11A-C present TEM images of SiNWs coated with Ti-EG (FIG. 11A-B) and $TiO_2$ (FIG. 11C) exposed to $Au^{3+}$ ion solution in the dark (FIG. 11A) and in the light (FIGS. 11B-C).
Figure 11B:
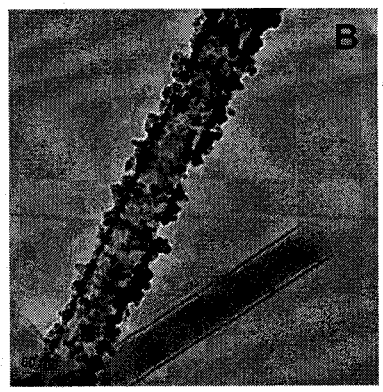
Figure 11C:
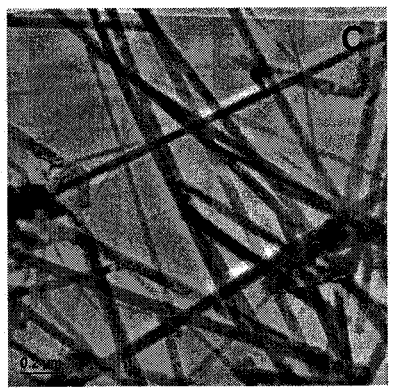

Silicon nanowires (SiNWs) with diameters of 30 nm were used as scaffold and coated with MLD Ti-EG films and annealed at 700° C. Subsequent treatment of the coated SiNWs with noble metal ions and hydrofluoric acid resulted in noble metal nanostructure deposition, SiNW/Ti-EG/M. Deposition of Au nanoparticles was demonstrated as a typical example; during the process Au nanoparticles deposited by the galvanic displacement reaction and SiNWs were etched with HF leading the formation of hollow Ti-EG tubes coated with Au as confirmed by HRTEM (FIGS. 11A-B). Whereas, SiNWs coated with ALD $TiO_2$ layers showed no galvanic deposition reaction (FIG. 11C), this was due to the compact nature of the $TiO_2$ films on SiNW.

Alternatively, silicon or germanium NW, having a diameter of between 5-150 nm, a length of between 0.5 micron to 10 micron have been used. The TiEG layer, formed from 10-80 cycles and annealed at a temp between 450-750° C. was doped with gold particles. Gold solution used for deposition comprised $AuCl_3$ in water, at a concentration between 0.1 mM and 5 mM with HF at a concentration between 0.1 mM and 500 mM. $H_2O_2$ was produced by shining UV light on the material when immersed in acidic solution of water (1-100 mM HCl).

The deposition of the metal nanostructure in the SiNW/Ti-EG was possible due to the molecularly permeable nature of Ti-EG. Thermal annealing of SiNW/Ti-EG assembly resulted in the loss of the organic part leaving voids for molecular ion diffusion on the oxide frame work. The gold metal deposition on SiNW/Ti-EG could be performed under light and dark condition. The deposition of gold nanostructure on SiNW/Ti-EG under light proceeded through galvanic displacement and/or initiated by photo excited electrons from Ti-EG film (photoreduction). However, in the dark the deposition mainly took place via galvanic displacement. FIG. 11A shows the formation of gold nanostructure in the dark; Au deposition only occurred inside the Ti-EG nanotube; this indicates the formation gold nanostructure through galvanic displacement assisted by the dissolution of SiNWs by HF.

FIG. 11B shows the deposition of gold nanostructure in and outside of the SiNW/Ti-EG nanotube; this result confirms the photodeposition of the gold nanostructure in addition to the galvanic deposition. Hence, the molecularly permeable Ti-EG nanotube provides best platform for assembling the gold nanostructure-SiNW/Ti-EG composite materials.

Figure 12:
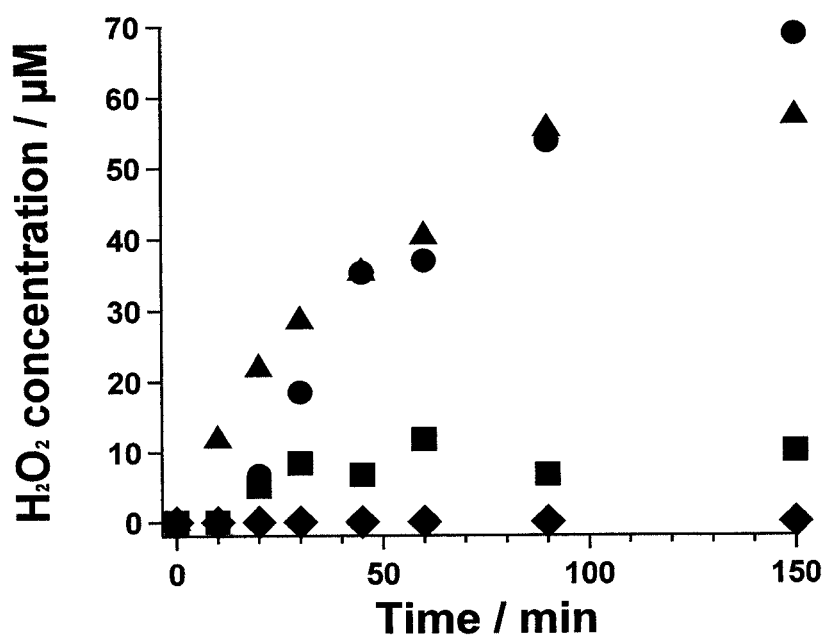
FIG. 12 demonstrates photocatalytic production of $H_2O_2$ on SiNWs/Ti-EG/Au in 0.03M HF aqueous solution with (●) and without (▲) $O_2$, on SiNWs/Ti-EG (♦) and on SiNWs/Ti-EG/Au without HF (■). Ti-EG coated SiNWs were annealed at 700° C. prior to Au deposition and a 365 nm UV light source was employed.

Initial experiments on photocatalytic production of $H_2O_2$ showed that SiNWs/Ti-EG/Au assembly could be used as an efficient catalyst without the use of a sacrificial hole acceptors. FIG. 12 shows typical results obtained for the photocatalytic hydrogen peroxide generation in acidic solution, measured by the iodide oxidation method.

The results demonstrate the catalyst efficiency in the formation of $H_2O_2$ at different conditions. It can be seen that no activity was observed without the gold deposition. The presence of oxygen showed minor influence on the $H_2O_2$ production. $H_2O_2$ formation can be achieved by the oxidation of water or by the reduction of oxygen. HF concentration have a strong effect on the $H_2O_2$ production it can be explain by the relative stability of $H_2O_2$ in acidic solution and the activation of the surface. The catalyst was reused for five times and it without showing any decrease in activity.

2.2 Modification of Ti-EG Surfaces 2.2.1 Separation of Compounds; Chiral Molecules The synthesis and separation of chiral organic compounds is the heart of modern research in biochemistry and pharmaceutical industry. Chiral compounds exist as enantiomers and exhibit identical physicochemical properties in conventional isotropic environments. The direct separation of chiral compounds requires the use of chiral environment. Several techniques were developed for the separation of enantiomers, the most popular and general method is liquid chromatography (LC and HPLC) using chiral stationary phases (CSPs). Considerable effort put in developing efficient and affordable chromatographic columns with CSPs. The principle relies on modifying the column packing materials (silica beds, nanoparticles) by a chiral molecule acting as a chiral selector.

Thin Layer Chromatography (TLC) is one of the most widely used separation method in preparatory organic synthesis. This technique provides direct resolution of enantiomers of a variety of compounds and own several advantages that include parallel separation of samples, short analysis time and low cost. Thus, a fast and reliable technique to identify the components of reaction products including chiral molecules is important before running other analytical separation experiments.

Figure 13B:
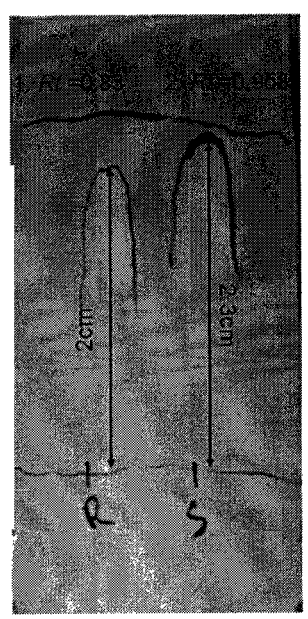
FIGS. 13A-B are photograph of TLC chromatogram showing resolution.
Figure 13A:

Exploiting the unique material properties of the Ti-EG layers (extensive OH functionality, molecular level permeability); they can be used to form a variety of layers with different properties of which chiral layers are of major interest. The Ti-EG layers can prepared on highly porous substrate employing the inherent advantages of MLD (highly uniform and conformal films). The principle using TLC silica gel plates which are commercially available is demonstrated. TLC plates were coated by Ti-EG film using MLD process and then chiral selector was absorbed by immersion of the plates in a solution of chiral compound. FIG. 13A is a photograph of chromatogram separation for (+) and (−) isomers of 2-methyl-1,4-butanediol in dichloromethane-hexane solution (ration 4:1). The Rf value for the resolved (+) R isomer of butanediol was 0.468.

Another example showing the separation of phenylethanol enantiomers is presented in (FIG. 13B), with Rf of 0.83 and 0.958 for the (+) and (−) isomers, respectively. This result suggests a facile formation of chiral stationary phase for the separation of enantiomers. The method can be extended to modify other column packing materials.

TLC plates were coated with 18 nm thick Ti-EG layer using MLD process and treated a chiral diol solution in acetonitrile. Two spot of the R- and S-stereoisomers of the target analyte were applied on CSP and were located by exposure to iodine vapors. A mixture dichloromethane and hexane was used as a mobile phase and the chromatogram allowed run for 10 min under a closed vessel at room temperature.

As detailed hereinabove, the chiral separation may alternatively be carried out using a chiral column loaded with a composition comprising the Ti-EG material, employing and chromatographic methodology known in the art.

2.2.2 Slippery Surfaces; Formation of Hydrophobic Surfaces

Wetting property of surfaces is a very important aspect of surface chemistry, which may have a wide variety of practical applications in biomedical science, textile industry, self cleaning surfaces and agriculture. The preparation and formation of artificial water-repellent surfaces (hydrophobic, super-hydrophobic) is mainly inspired by naturally existing surfaces (Lotus leaf, butter fly wings etc.). The measure of hydrophobicity of surfaces is the contact angle of the water droplet which gives an indication of the wettability of the surface. But for practical application the sliding angle (dynamic angle) in which the droplet start to roll off is important. Methods to prepare hydrophobic surfaces include surface modification with monolayers and polymers, nanostructuring of surfaces and locking lubricating liquids in nanoporous substrate.

Figure 14:
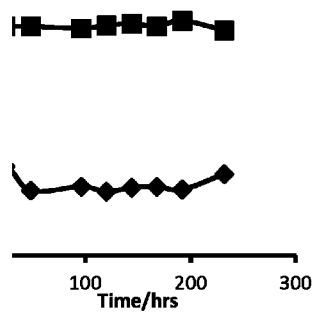
FIG. 14 shows water contact angle on glass slides coated with 18 nm Ti-EG layers and treated with perfluoropolyether liquid; without (■) and with (♦) temperature treatment of Ti-EG layers.

The OH functionality of the Ti-EG layers is a key feature for the physical and chemical modification of the surface. The layers can serve as a host material for the immobilization of liquids with different polarity. A proper match between the guest liquid and the Ti-EG layer will result in a stable liquid film owing different wetting properties or buffer surface to reduce friction. High boiling perfluoropolyether liquids have been used to illustrate the principle. Glass plates were coated with few nm thick layer of Ti-EG and immersed in these liquids for 20-30 min followed by careful 'drying' with $N_2$ stream. This led to the formation of very thin and uniform liquid films on top of the Ti-EG layers. Initial result showed water contact angle of 120-125° stable for days. In contrast, glass plates coated with Ti-EG layers and annealed at 350° C. prior to the treatment of perfluoropolyether liquids exhibits water contact angle of 40°. The result shows the Ti-EG layer can potential interact with O atoms of the perfluoropolyether and lock the liquid in place (FIG. 14).

2.3 Extraction of Heavy Metals

Environmental remediation (removal of heavy metals) is an active field of research with potential industrial application as the strict environmental regulations pushes to more green process. The need for removal of heavy metals from solutions originate; i) some heavy metals (Cd, Hg, Cr and Pb) pose a serious health threat to living organisms and ii) the extracted metals (noble metals) may have commercial values. Most commonly used methods for speciation of heavy metal include precipitation, solvent extraction, activated carbon adsorption, ion exchange resins and biosorption.

Figure 15A:
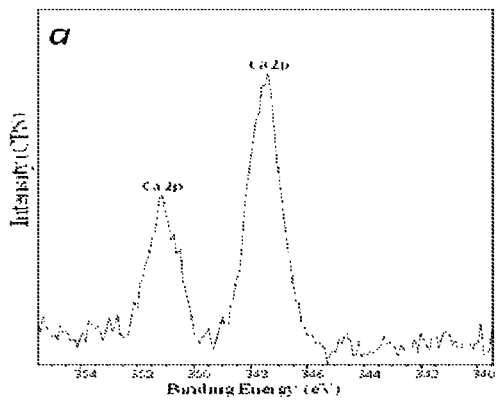
FIGS. 15A-B show XPS spectra.
Figure 15A:
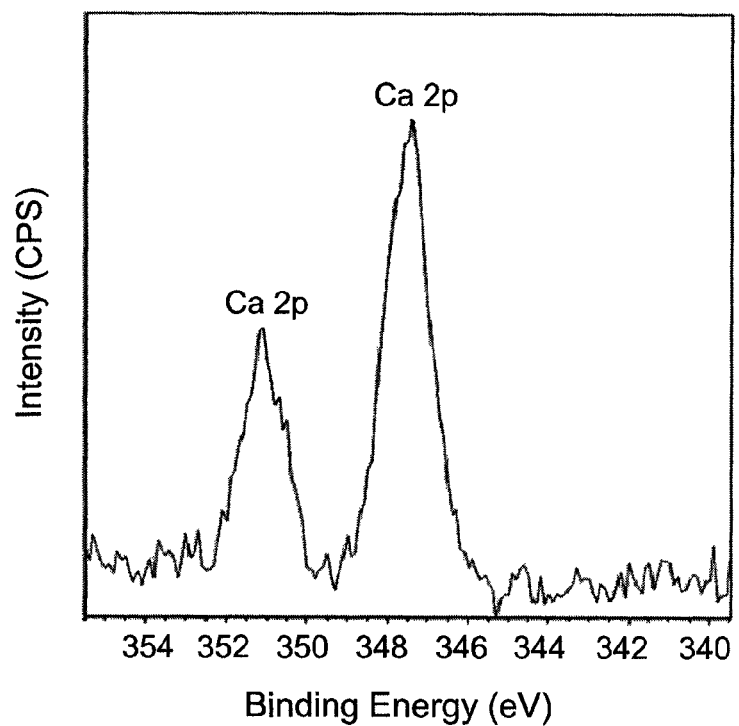
Figure 15B:
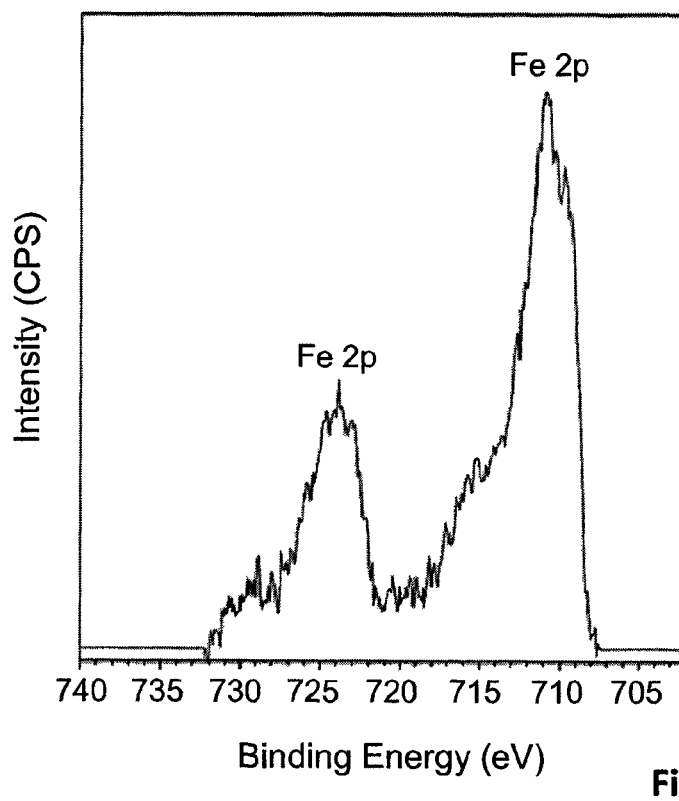

Ti-EG layers dipped in different solutions show high affinity towards metal ions. This phenomenon arises due to the functionality of the layer and/or diffusion of the metal ions through the layer. FIG. 15 shows a representative example of the Ti-EG layers exposed to solution containing $Fe^{3+}$ and $Ca^{2+}$ ions. The incorporation of the ions is monitored by XPS measurements. The simple and straight forward experiment shows Ti-EG layers can potential be used for extraction of heavy metals and integrated with appropriate detection system either spectroscopy or electrochemical methods.

Experimental Section

MLD Process

Ti-EG films were prepared using $TiCl_4$ (Acros, 99.9%) and ethylene glycol (Aldrich, >99%). Ultra pure water (>18MΩ, ELGA purification system) was used for ALD of $TiO_2$. Ultrahigh purity Ar gas was used as the carrier gas in viscous flow reactor and for purge between reactant exposures. MLD films were prepared by dosing the reactant precursors into Ar carrier gas. The duration of precursor dosing was controlled using computer controlled pneumatic valves. A steady state pressure of $2.1 \times 10^{-1}$ mBar was maintained during the process. For the MLD process the water and EG precursor chamber temperature was set to 40 and 80° C., respectively. Sample reaction temperature was set to 100, 110, and 120° C. for various processes. The films were prepared on various substrates such as $SiO_2$/Si wafers, quartz slides, and 40 nm $SiO_2$ membranes for TEM measurements. Prior to film formation the substrates were cleaned using Oxygen Plasma for 1 min, 60 W RF power. Unless otherwise mentioned the number of cycles performed was set to 40 cycles for Ti-EG and 220 cycles for $TiO_2$ films with film thickness of ~16 nm for both. Films were thermally annealed at the different specified temperature for 30 minutes. For thermal anneal of the films, the oven temperature is equilibrated to the desired temperature prior to sample loading to avoid kinetic effects of temperature ramp rate.

Porphyrin Adsorption and Photocatalytic Degradation Measurements 5,10,15,20-Tetrakis(4-hydroxyphenyl)-21H,23H-porphine (4OHTPP) was obtained from Aldrich and used as received. 0.08 mM acetonitrile solution of 4OHTPP was prepared and used for adsorption studies as spectroscopic marker. Absorption spectroscopy was performed using a Perkin-Elmer Lambda 1050 spectrophotometer using a custom built slide holder. Ti-EG or $TiO_2$ films formed on quartz slides were annealed at various temperatures. 4OHTPP adsorption to the films was measured by immersion of the Ti-EG or TiO2 quartz coated slides in the 4OHTPP solution for different time intervals until maximal porphyrin loading was reached as indicated by the Soret absorbency. All porphyrin adsorption studies were carried out in the dark to prevent unintended photodegradation of the surface-adsorbed molecules. For measuring the photocatalytic degradation of 4OHTPP on Ti-EG or $TiO_2$ films the coated quartz slides were immersed in the porphyrin solution for 2 hrs, rinsed three times with acetonitrile, and dried under $N_2$ stream in the dark. Then, the dry films were subjected to a 365 nm light source for different time intervals and measurement of the absorption spectra corresponding for each time interval.

$SiO_2$/Si Nanowire Growth

Si NWs were grown in a custom built CVD system using vapor-liquid-solid mechanism. During the nanowire growth process temperature was set to 440° C., 35 torr pressure, 10 min duration, 50 sccm $H_2$, and 2 sccm $SiH_4$ gas flow. 40 nm thick $SiO_2$ membranes were used as substrates (Ted Pella, Inc.) for nanowire CVD growth and direct TEM imaging without further sample preparation required. For direct $SiO_2$/Si nanowire growth on the membranes a drop of Poly-L-lysine solution, 0.1% (w/v) in $H_2O$ (Sigma) was placed on the membrane for 5 min followed by rinse with DI water and dried under $N_2$ stream. Then a drop containing 30 nm Au nanoparticle solution (Ted Pella, Inc.) was placed on the membrane for 2 min, followed by thorough rinse with DI water and dried over $N_2$ stream.

Characterization Techniques

TEM measurements were performed using FEI Tecnai F20-$G^2$ system with EFTEM (GATAN GIF 2001).

X-ray photoelectron spectroscopy (XPS) data was collected with a Kratos Axis Ultra X-ray photoelectron spectrometer. Spectra were acquired with monochromatic Al(kα) radiation.

Spectroscopic ellipsometry measurements were performed using a VB-200 Spectroscopic Ellipsometer (Woolam Co.).

The invention claimed is:

1. A process for producing a permeable organic/inorganic hybrid material comprising a metal oxide material, the process comprising:

forming by molecular layer deposition (MLD) an organic/inorganic molecular film on a surface; and annealing said film at a temperature in a range of 200° C. to 900° C. and under an atmosphere of at least one selected from the group consisting of air, nitrogen, hydrogen, an inert gas, or in vacuo, permitting formation of the permeable organic/inorganic hybrid material comprising a photocatalytically active metal oxide material.

2. The process according to claim 1, wherein the organic/inorganic molecular film formed on a surface is prepared by:
   (1) forming a layer of a metal source on the surface; and
   (2) treating the layer of the metal source with an organic active material.

3. The process according to claim 2, wherein step (1) involves flowing a metal source one or more times over the surface, thereby permitting a reaction between the metal source and the surface material.

4. The process according to claim 2, wherein step (2) involves flowing the organic active material one or more times over the metal source film to allow reaction between the organic active material and the metal source.

5. The process according to claim 2, wherein following step (2), the film is thermally annealed at a temperature in a range of 200° C. to 900° C. and under an atmosphere of at least one selected from the group consisting of air, nitrogen, hydrogen, an inert gas, or in vacuo.

6. The process according to claim 4, wherein said metal source is of a metal being selected amongst metals, transition metals and metalloids of the Periodic Table of the Elements.

7. The process according to claim 6, wherein said metal is selected from Ti, Zn, Fe, V, Ni, and Cr.

8. The process according to claim 4, wherein said metal source is selected from a metal halide, a metal hydroxide, a metal alkyl and a metal complex with one or more ligand moieties.

9. The process according to claim 4, wherein the organic active material is an organic material comprising two or more alcohol or amine functional groups.

10. The process according to claim 4, wherein the organic active material is an aliphatic material comprising between 2 and 5 carbon atoms and two or more alcohol and/or amine functional groups.

11. The process according to claim 9, wherein the organic active material is selected amongst aliphatic alcohols and aliphatic amines.

12. The process according to claim 11, wherein the aliphatic alcohol is a dialcohol.

13. The process according to claim 12, wherein the dialcohol is ethylene glycol (EG).

14. The process according to claim 5, wherein prior to or after annealing of the film, the film is doped with at least one metal atom, metal cation, a non-metal dopant or an organic or inorganic material.

15. The process according to claim 4, wherein the metal source is Ti-halide and the organic aliphatic alcohol being ethylene glycol (EG), the Ti-EG film being annealed to afford $TiO_2$.

16. The process according to claim 15, wherein the $TiO_2$ is anatase $TiO_2$.

17. The process according to claim 4, wherein said surface is of a material particulate selected amongst (nano)particles and (nano)wires.

18. A process for producing a permeable organic/inorganic hybrid material comprising a metal oxide material, the process comprising:
   forming by molecular layer deposition (MLD) an organic/inorganic molecular film on a surface, said film comprising at least one metal selected from the group consisting of Zn, Zr, Fe, Ti, V, Cu, Ni, Bi and W; and
   annealing said film at a temperature in a range of 200° C. to 900° C. and under an atmosphere of at least one selected from the group consisting of air, nitrogen, hydrogen, an inert gas, or in vacuo, permitting formation of the permeable organic/inorganic hybrid material comprising a photocatalytically active metal oxide material, said oxide being of the at least one metal selected from the group consisting of Zn, Zr, Fe, Ti, V, Cu, Ni, Bi and W.

19. A process for producing a permeable organic/inorganic hybrid material comprising a metal oxide material, the process comprising:
   forming by molecular layer deposition (MLD) an organic/inorganic molecular film on a surface by:
   (1) forming a layer of a metal source on a surface; and
   (2) treating the layer of the metal source by flowing an organic active material one or more times over the metal source film to allow reaction between the organic active material and the metal source; and
   annealing said film at a temperature in a range of 200° C. to 900° C. and under an atmosphere of at least one selected from the group consisting of air, nitrogen, hydrogen, an inert gas, or in vacuo, permitting formation of the permeable organic/inorganic hybrid material comprising a photocatalytically active metal oxide material.

* * * * *